United States Patent Office 3,110,084
Patented Nov. 12, 1963

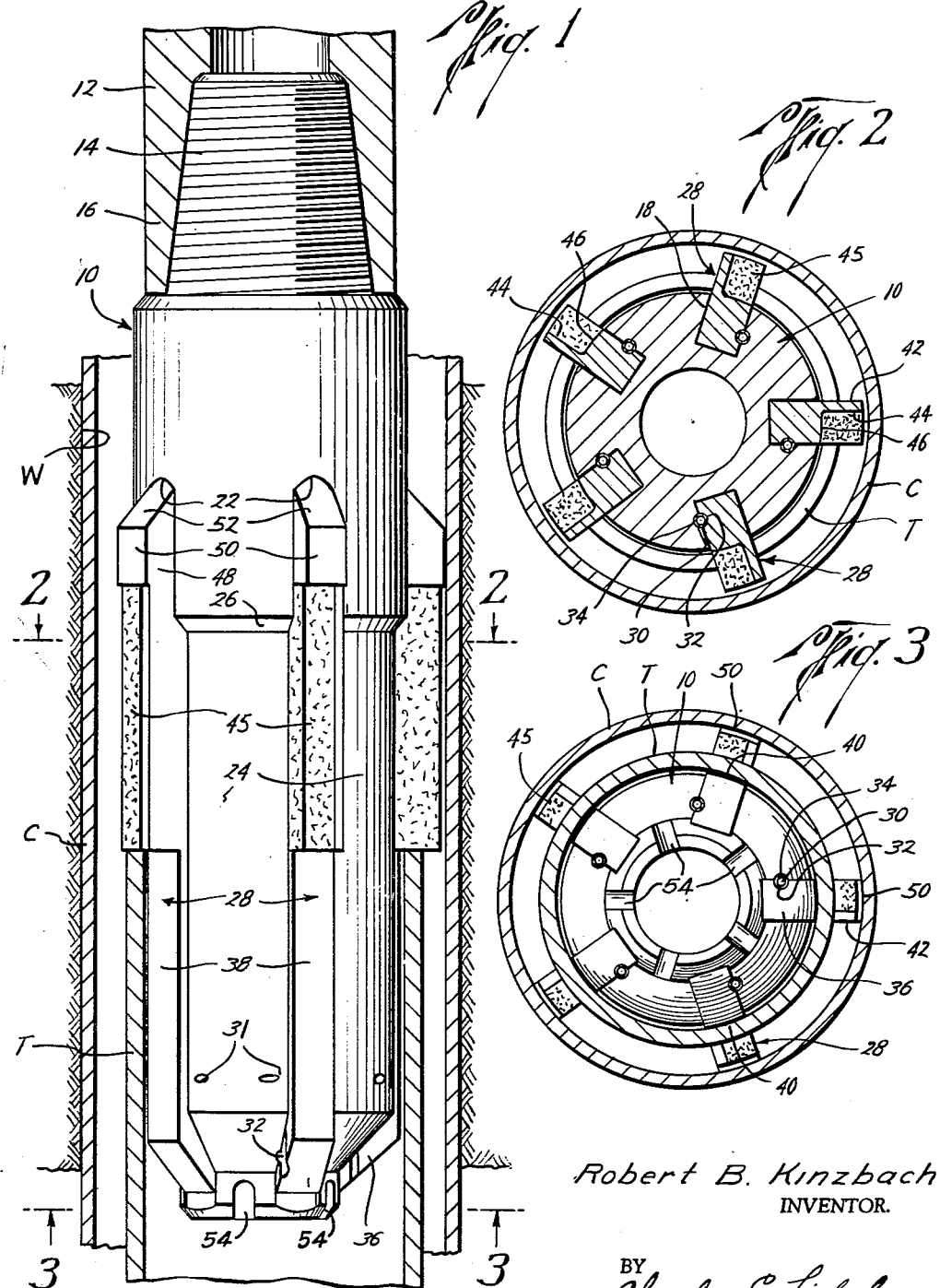

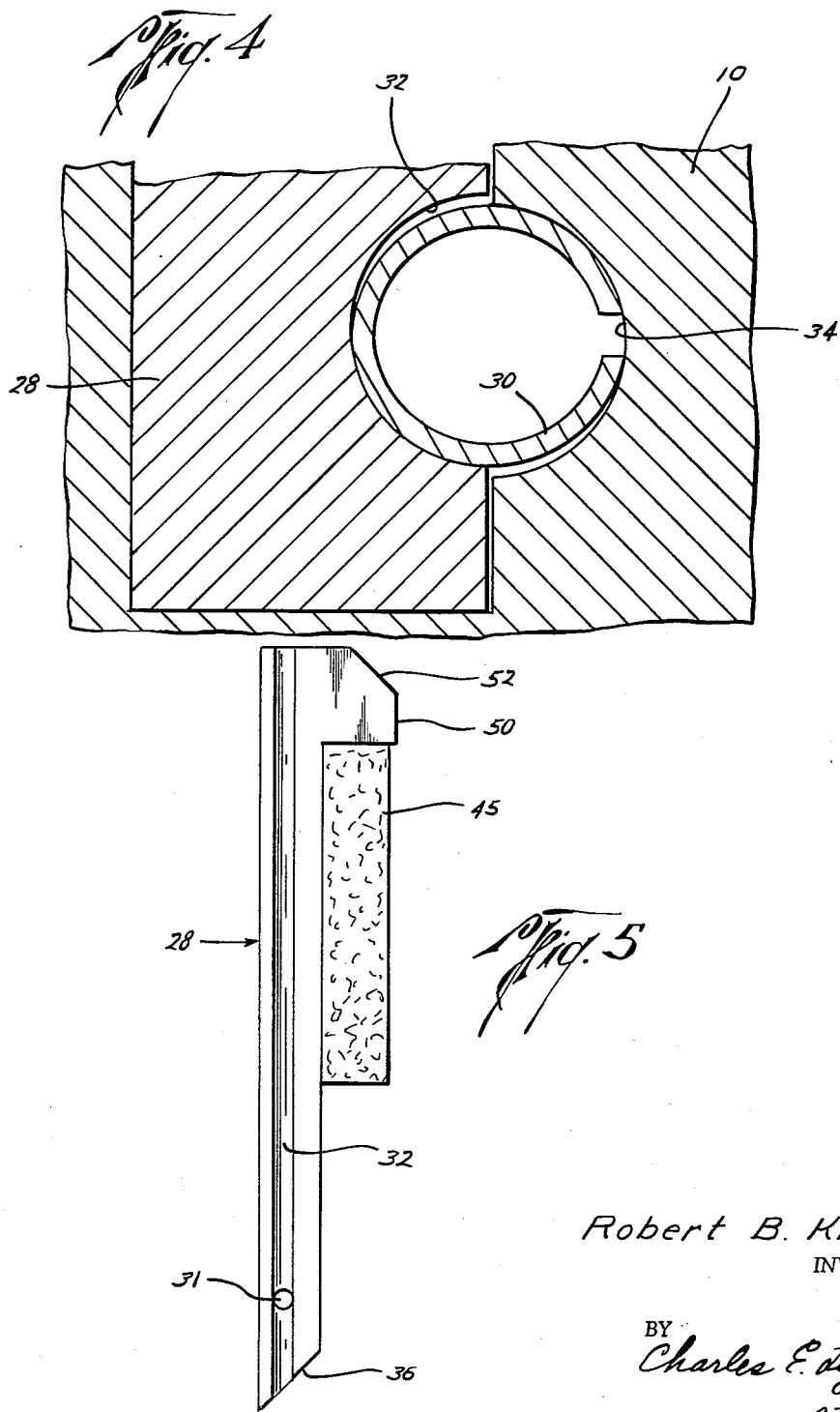

3,110,084
PILOTED MILLING TOOL
Robert B. Kinzbach, 2411 Summer St., Houston, Tex.
Filed Aug. 15, 1958, Ser. No. 755,358
3 Claims. (Cl. 29—105)

This invention relates to milling tools and more particularly to a tool which is designed for use in conducting end milling operations on tubular material such as a well liner or tubing located within a well bore, part of which may have been cased with a larger sized pipe.

The invention finds particular application in connection with remedial or work-over operations in oil wells wherein it becomes necessary to remove sections of pipe from the well bore.

In oil and gas wells it is common practice to set a string of casing in the well bore whose lower end is positioned at a point above the producing formation, and a liner is then placed within the casing and extending downwardly therefrom through the producing formation. In the removal of such liners it is customary to first attempt to pull the same by the use of suitable fishing tools, and for this purpose it is often necessary to cut the liner into sections of suitable length before pulling the same. Operations of this kind are, however, often rendered very difficult or impossible due to packing of the formation about the liner. Other well conditions requiring removal of tubing or pipe from the well bore sometimes develop from errors in carrying out cementing operations, the accumulation and packing of sand in the annulus between the tubing and casing, etc.

Under conditions such as those mentioned above, it is often desirable to completely drill up the pipe or tubing as a removal procedure, eliminating the necessity for cutting and pulling operations. It is for milling operations of this kind that the tool of the present invention has been especially developed.

The invention has for an important object the provision of a tool for use in a well bore or other similar location for milling up a tubular object such as a pipe or tubing located in such bore.

Another object of the invention is to provide a milling tool assembly having a pilot portion adapted to be extended into a tubular work piece in advance of the cutting portion of the tool and whose exterior is shaped to form with the surrounding portion of the work piece a passageway for the circulation of fluid through the tool and bore.

A further object of the invention is the provision of a tool of the character referred to designed for the use of cutting portions formed of hard, brittle cutting material imbedded in a metallic matrix in a manner to present new cutting edges upon fracturing of the particles.

Another object of the invention is to provide a milling tool of the type mentioned having elongated cutter portions positioned for endwise cutting engagement with the work and which are formed of an abrading material whereby the cutter portions are gradually worn away in use to prolong the life of the tool.

A further object of the invention is the provision of a milling tool having a body formed with a pilot section adapted to be extended into a tubular work piece to guide and center the tool relative to the work, and blade elements removably carried by the body and which may be replaced by blade elements of different sizes to adjust the tool diameter as required.

Another object of the invention is to provide a tool of the kind referred to having a body formed with a pilot portion shaped to enter a tubular work piece to guide and align the body relative to the work, blade elements on the body extending radially outwardly beyond said pilot portion for endwise engagement with the work, and means on said blade elements extending radially outwardly beyond the cutting portions of the elements in position for engagement with the surrounding wall of a well casing to hold the cutting portion of the blade out of contact with said wall.

A further object of the invention is the provision of a milling tool having a tubular body having a portion shaped to be extended into a tubular work piece for limited lateral movement relative thereto and blade elements carried by the body and extending radially therefrom in position for endwise engagement with the work piece, all of the blade elements being positioned about the body to limit lateral movement of the body relative to the work within a well casing surrounding the work and whose internal radius is somewhat greater than the radial distance to which the blade elements extend from the center of the body.

Another object of the invention is to provide a cutting tool of the character mentioned wherein means is provided on the tool positioned for coaction with the work piece to substantially restrict the flow of circulating fluid through the tool at a predetermined condition of tool wear, to indicate the depleted condition of the cutting portions.

A further object of the invention is the provision of a milling tool of the type mentioned having a pilot portion shaped to be inserted in a tubular work piece and blades formed with cutting portions positioned for endwise engagement with the work piece, and also having guide portions which extend within the work piece and formed with end cutting portions positioned to drill away accumulated material in the work piece in advance of the portion of the work which is being milled.

A still further object of the invention is to provide a milling tool of the kind mentioned which is of simple design and rugged construction, having replaceable blade elements arranged for easy assembly and disassembly requiring only tools which are usually available on drilling rigs.

The above and other important objects and advantages of the invention may best be understood from the following detailed description of a preferred embodiment of the same, when considered in conjunction with the annexed drawings, wherein—

FIGURE 1 is a side elevational view, partly in cross-section, illustrating a preferred embodiment of the invention and showing the tool in operating position within a work piece located in a well casing;

FIGURE 2 is a cross-sectional view, taken along the line 2—2 of FIGURE 1, looking in the direction indicated by the arrows;

FIGURE 3 is a cross-sectional view, taken along the line 3—3 of FIGURE 1, looking in the direction indicated by the arrows;

FIGURE 4 is a fragmentary, lateral, cross-sectional view, on a greatly enlarged scale, of a portion of the body and cutter blade of the invention, as shown in FIGURE 2, the means for and manner in which the cutter blades are retained in position on the body; and FIGURE 5 is a side elevational view of one of the cutter blades of the invention, showing the same removed from the body.

Referring now to the drawings in greater detail, the invention is disclosed herein in connection with its use as a tool for milling away sections of a tubing string located within a casing in the bore of a well, it being understood that such use of the invention is intended by way of example only and that the tool of the invention is capable of a wide range of application wherever it may be desired to perform a milling operation on a tubular object or work piece. In the present illustration the tool of the invention is shown in position in the upper end of a section of well pipe or tubing T, located within a casing C in a well bore W.

The milling tool comprises a tubular body, generally designated by the numeral 10, adapted to be connected at one end to the lower end of a tubular operating string 12, as by means of the externally threaded pin portion 14 of the body which is threadably connected to the internally threaded lower end portion 16 of the string for rotation with the string. The body 10 has longitudinal, peripherally spaced grooves 18 which terminate at their upper ends short of the externally threaded pin 14. The inner ends of the grooves may terminate in curved end wall portions as best seen at 22 in FIGURE 1.

The body 10 has a portion 24 of reduced external diameter terminating at one end at the lower end of the body and at the other end in a shoulder 26, which reduced portion is smaller in external diameter than the internal diameter of the tubing T so that it may be inserted within the end of the tubing.

A cutter blade 28 is carried in each of the slots 18, being retained therein by suitable means, such as the pin 30 which fits into grooves 32 and 34, respectively, in the blade and slot, and the pin 31 which extends into laterally aligned openings in the body and blade to hold the blade against longitudinal movement in the external recess or slot 18. The pins 30 are of conventional elastic construction such as those commonly known as "roll pins," formed of sheet metal rolled into a tubular form of split-ring shape in cross-section to permit the pins to be contracted when pressed into the openings provided for them and to expand when so inserted in the openings to securely hold the parts assembled.

The grooves 32 and 34 of the blade and body may be positioned to be slightly offset so that the tubular pins 30 will be somewhat out of round when inserted in the grooves 32 and 34. Thus the pin 30, as best seen in FIGURE 4, will bear against the outer edge portion of the groove 32 and against the inner edge portion of the groove 34, to provide slight clearance between the pin and the outer edge portion of the groove 34 and between the pin and the inner edge portion of the groove 32, to compress the pin into an out of round condition, as illustrated in FIGURE 4. When the pin 30 is inserted in the grooves the pin will exert forces on the blade and body tending to hold the blade tightly in the elongated, external recess or slot 18 and to oppose any force on the blade due to rotation of the tool with the blade in contact with the work tending to tilt the blade.

The blades 28 extend at their lower ends somewhat beyond the lower end face of the body 10 and are formed with radially inwardly sloping end faces 36, as seen in FIGURE 1, to provide end cutting portions positioned to cut away accumulated sand and other debris in the tubing T as the tool advances in the tubing. The blades are formed with lower end portions 38 which extend radially outwardly beyond the portion 24 of the body in position for insertion into the tubing T and having outer faces 40 positioned for engagement with the inner wall of the tubing to serve as pilot wear strips to substantially align the tool in the work. Above the portions 38, the blades 28 are formed with radially outwardly extending portions 42 each having a radially extending side wall 44 and a bottom wall 46 forming an angle shaped groove for the reception of particles of hard cutting material such as tungsten carbide, which are embedded in a metal matrix bonded to the side wall 44 and bottom 46 of the groove in position to form the cutting portions of the blades. It will be apparent that the hard cutting particles and the matrix in which they are held form the cutting portions 45 of the blades which will be strongly backed by the wall 44 of the blade as the body of the tool rotates clockwise as seen from above, so that the cutting portions 45 of the blade will be slowly worn away by abrading of the backing and matrix during the use of the tool.

Above the cutting portions of the blades 28, the blades are formed with radially extending shouldered portions 48 extending slightly beyond the outer faces of the cutter portions and formed with outer faces 50 positioned for engagement with the inner wall of the casing C to hold the cutting portions of the blades out of contact with the casing to prevent cutting or abrading away of the casing during the milling operation on the tubing. The upper ends of the blades 28 may be formed with sloping faces 52 which slope outwardly and downwardly radially, and the end faces 53 of the blades which are positioned in the recesses 18 may be rounded to fit the rounded end faces 22.

The lower end face of the body 10 may be of somewhat conical shape and may be provided with radially extending slots 54 located between the blades 28 to permit the free flow of fluid from the interior of the body across the lower end face thereof and upwardly between the blades. The sides of these recesses may be hard surfaced for cutting through sand or cement packed in the liner or casing.

In making use of the tool of the invention the body 10 is connected to the operating string 12 and lowered into the well casing C until the pilot forming portions 38 of the blades 28 enter the tubing T and the cutting portions 45 of the blades are in contact at their lower ends with the upper end of the tubing. With the milling tool thus positioned the milling operation may then be performed by rotating the string.

During the milling operation fluid may be circulated down through the string 12 and body 10 to pass out through the grooves 54 between the lower end portions of the blades 28 and upwardly about the body into the interior of the casing C about the string. As the tubing T is milled away the cutting portions 45 of the blades 28 and the backing wall 44 will be gradually worn away longitudinally upwardly along the blades, and when the wear on the blades has progressed to a point at which the shoulder 26 of the body is positioned close to or within the upper end of the tubing the circulation of fluid through the body 10 and upwardly between the blades will be restricted to indicate the worn condition of the tool before the cutting portions of the blades are entirely worn away.

Due to the hard, brittle character of the cutting particles of the cutter blades, new cutting edges will be presented by the fracturing of the particles as the cutting portions of the blades are worn away, so that a high cutting efficiency of the tool is maintained throughout the life of the blades.

In the event that the tubing T is not centered in the casing C the radially extending portions 48 of the blades in contact with the inner wall of the casing will prevent the cutting portions of the blades from engaging and grinding or wearing away the casing.

The blades 28 are readily driven out and replaced when worn after removing the pins 31, and the blades may be furnished in sets of different sizes to extend to different distances radially outwardly from the body, whereby the tool may be made to accommodate different sizes of tubing and casing and different combinations of tubing and casing sizes to meet the requirements of the particular conditions of use.

The cutter blades are arranged in peripherally spaced relation about the body, each of the blades being positioned on a different diameter of the body, so that the blades do not lie diametrically opposite each other, thus permitting lateral wobble of the tool relative to the work, and within the limits of pilot clearance.

It will thus be seen that the invention constructed and arranged as described above provides a milling tool which is of simple design and economical manufacture, wherein the cutter elements are easily replaced and which embodies means for indicating a worn condition of the tool and also means for holding the cutting portions of the tool out of contact with a surrounding well casing.

The invention has been disclosed herein in connection with a particular embodiment of the same, but it will be understood that this is intended by way of example only, and that various changes can be made in the construction and arrangement of the parts within the spirit of the invention and the scope of the appended claims.

Having thus clearly shown and described the invention, what is claimed as new and desired to secure by Letters Patent is:

1. A milling tool for performing an endwise cutting operation on the upper end of a tubing located in a well bore comprising a generally cylindrically shaped body adapted to be connected to an operating string for rotation and lowering with the string in the well bore to position the body with its lower end extending into the upper end of the tubing in substantially concentric relation thereto, longitudinally extending, peripherally spaced, cutter elements on the body having lower end portions extending radially outwardly from the body to positions for guiding engagement with the inner surface of the tubing when the body is inserted into the upper end of the tubing to center the body in the tubing, said elements having cutting portions located above and extending radially outwardly beyond said lower end portions in position for endwise engagement with said upper end and portions located above and extending radially outwardly beyond said cutting portions and whose outer exremities are disposed for movement in a circular path whose diameter is less than the diameter of the bore.

2. A milling tool for performing an endwise cutting operation on the upper end of a tubing located in a well bore comprising a tubular body adapted to be connected at its upper end to a tubular operating string for rotation and lowering with the string in a well bore to position the body with its lower end extending into the upper end of the tubing, longitudinally extending, peripherally spaced blade elements on the body forming between them passageways whose lower ends are in communication with the interior of the body and which open into the bore and having lower end portions extending radially outwardly from the body in position to extend into the upper end and engage the inner surface of the tubing to center the body in the tubing, said elements having cutting portions above and extending radially outwardly beyond said lower end portions in position to perform a cutting operation on the tubing when the body is moved downwardly to move the cutting portions into endwise engagement with said upper end and rotated to allow the body to be extended further into the tubing as said cutting portions are worn away and portions above and extending radially outwardly beyond said cutting portions and whose outer extremities are disposed for movement in a circular path whose diameter is less than the diameter of the bore, and external means on the body extending radially outwardly therefrom below the upper ends of said cutting portions in position for coaction with the tubing to restrict the flow of fluid through said passageways when said cutting portions have been worn away to a predetermined extent.

3. A milling tool for performing an endwise cutting operation on the upper end of a tubing located in a well bore comprising a tubular body adapted to be connected at its upper end to a tubular operating string for rotation and lowering with the string in said bore to position the body with its lower end extending into said upper end, an odd number of external, longitudinally elongated recesses in the body positioned at equal angles about the longitudinal axis of the body, blade elements removably mounted in the recesses and having axially and radially outwardly extending lower end portions positioned to be extended into said upper end into engagement with the inner surface of the tubing to center the body in the tubing and cutting portions above and extending radially outwardly beyond said lower end portions in position for endwise cutting engagement with said upper end, said elements also having portions above and extending radially outwardly beyond said cutting portions and whose outer extremities are positioned for movement in a circular path whose diameter is less than the diameter of the bore.

References Cited in the file of this patent

UNITED STATES PATENTS

| | | |
|---|---|---|
| Re: 20,020 | Blanc | June 30, 1936 |
| 1,287,678 | Hall | Dec. 17, 1918 |
| 2,014,805 | Hinderliter | Sept. 7, 1935 |
| 2,118,242 | Thomas | May 24, 1938 |
| 2,167,194 | Anderson | July 25, 1939 |
| 2,234,965 | De Vlieg | Mar. 18, 1941 |
| 2,264,299 | Crosby | Dec. 2, 1941 |
| 2,553,701 | Comstock | May 22, 1951 |
| 2,803,301 | Warner | Aug. 20, 1957 |
| 2,815,688 | Forbes | Dec. 10, 1957 |
| 2,846,193 | Chadderdon | Aug. 5, 1958 |
| 2,872,159 | Autry | Feb. 3, 1959 |
| 2,901,222 | Pease | Aug. 25, 1959 |